United States Patent [19]

Weber et al.

[11] 4,017,147
[45] Apr. 12, 1977

[54] COMPARISON MICROSCOPE

[75] Inventors: Klaus Weber, Konigsbronn; Lothar Trapp, Heidenheim (Brenz), both of Germany

[73] Assignee: Carl Zeiss-Stiftung, Wuerttemberg, Germany

[22] Filed: Feb. 10, 1975

[21] Appl. No.: 548,672

[30] Foreign Application Priority Data

Feb. 15, 1974 Germany .................. 2407270

[52] U.S. Cl. .............................. 350/30; 350/91; 356/168

[51] Int. Cl.² ...................................... G02B 21/18

[58] Field of Search ............. 350/30, 91; 356/165, 356/168

[56] References Cited

UNITED STATES PATENTS 3,785,714  1/1974  Hock et al. ............... 350/30 X

*Primary Examiner*—David H. Rubin
*Attorney, Agent, or Firm*—Hopgood, Calimafde, Kalil, Blaustein & Lieberman

[57] ABSTRACT

The invention contemplates an improved microscope having a partially transmitting mirror in the observation light path, the mirror deflecting some of the illuminating light path onto a first object, while a second object is located in the light path which passes through the mirror. In one form, the reflected and transmitted light paths are designed symmetrically, and each includes one microscope objective; one of these objectives is adapted to be inclined with respect to the direction of the light beam, and a stop is so positioned in the system that the two separately observed objects appear simultaneously and side-by-side in the field of view of a single eyepiece.

7 Claims, 6 Drawing Figures

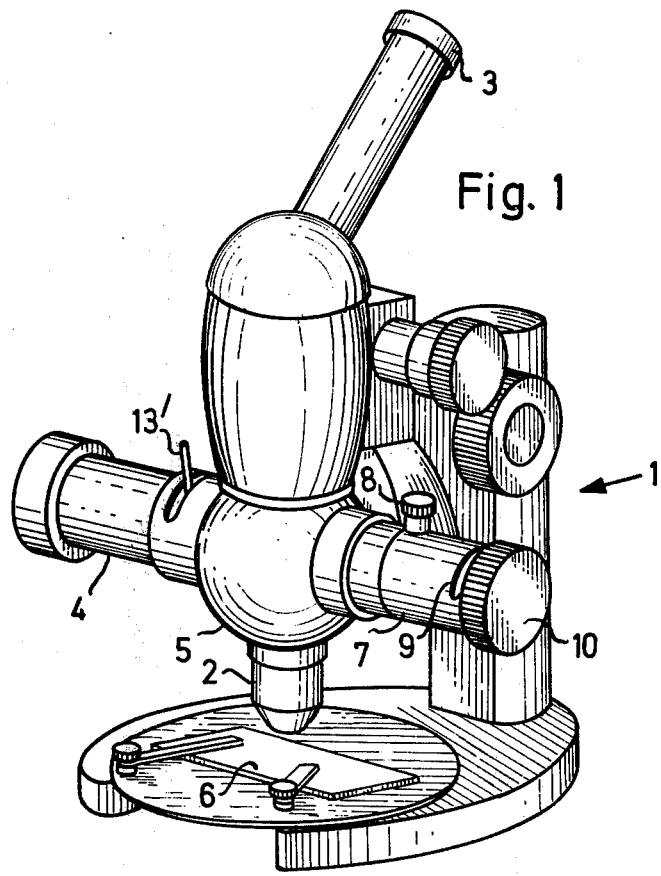
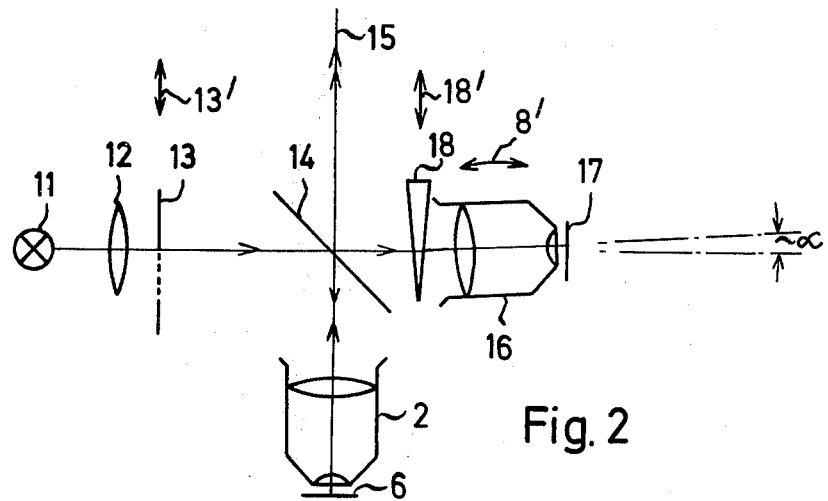

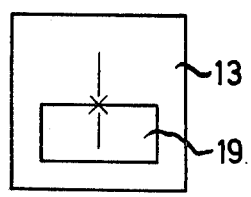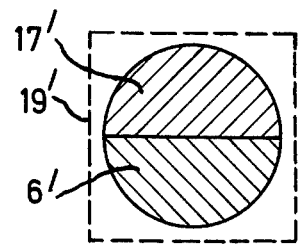
Fig.3a  Fig.3b
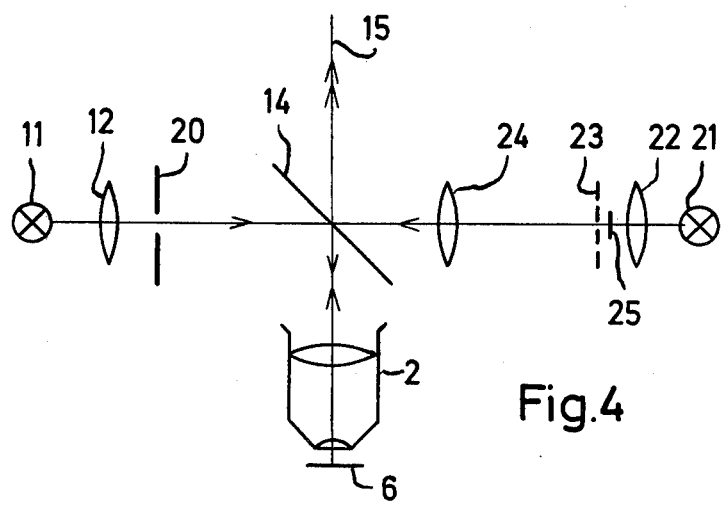
Fig.4
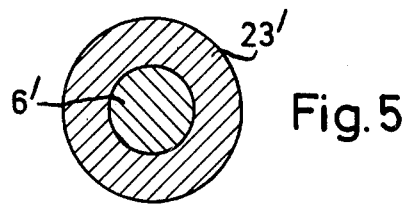
Fig.5

COMPARISON MICROSCOPE

This invention relates to a comparison microscope for the simultaneous observation of two objects, in which a partially transmitting mirror arranged in the observation light path serves for the deflection of the illuminating light path onto one of the objects.

For evaluating microscopic images, it is of considerable advantage in many cases to present to the observer the image to be evaluated and a comparison image, both in the same field of view. Then, the observer can simultaneously see both images and make the comparisons necessary for the evaluation.

The prior art includes specific comparison microscopes which enable the simultaneous observation of two objects. The prior art also includes comparison bridges for interconnection of two microscopes in order to present two field-of-view halves in a common tube, each half field being produced by one of the microscopes. Such special microscopes and comparison bridges are relatively unhandy and involve expensive construction.

It is also known to supplement the function of a reflected-light microscope used for observation of positional procedure in planar technology, which contains a partially transmitting mirror in the observation light path serving to deflect the illuminating light path onto the main object to be observed, by arranging an additional deflecting mirror in the partial light path passing through said partially transmitting mirror and directing the light to a second object (adjacent the main object) through an additional microscope objective arranged with its axis parallel to and offset from that of the main objective. Such prior-art structure enables simultaneous observation of two objects, but their images are superimposed with respect to each other and are consequently reduced as to their contrast. In the prior-art microscope, this is of no importance since only the extent of congruence of the position of different points is to be observed, and no image comparison is to be carried out. This prior-art microscope operates with objectives of infinite back focus and therefore requires an additional tube lens to produce an image in the image plane of the eyepiece.

It is an object of the present invention to provide an improved comparison microscope for simultaneous observation of two objects.

Another object is to meet the above object with relatively little modification of a commercially available reflected-light microscope.

A specific object is to meet the above objects with structure which enables simultaneous observation of the two objects in separate spaced fields of view, within the field of a single eyepiece.

Another specific object is to achieve the above objects by the mere attachment of a single additional structure, secured by a few simple manipulations, and producing an image-comparison capability of first-rate quality and convenience.

Briefly stated, the invention involves a microscope in which a partially transmitting mirror is arranged in the observation light path and serves for the deflection of the illuminating light path onto a first object, while a second object is located in the light path which passes through the mirror. In one form, the reflected and transmitted light paths to the two objects are designed symmetrically, and each includes one microscope objective. Two different diaphragm techniques are described for assuring separation of the two images in the field of a single eyepiece.

In the novel microscope, the beam-splitting mirror of the vertical illumination axis is used for deflecting a comparison image into the observation light path, the light paths to the main object and to the comparison object being symmetrical. This permits an exact adaptation of the imaging scale of both light paths with respect to each other, in that the path length may be changed in one of the branches. Moreover, such a design permits an unobjectionable and exactly equal illumination of both objects since the symmetrical light paths both comply with the rules of microscopic object illumination. In each of the two light paths, one transmission and one reflection occur at the splitting mirror, so that therefore no color deviations can occur between the light paths. A microscope designed in accordance with the present invention is therefore absolutely neutral as to color and represents a real comparison microscope.

By an inclination of one of the objectives with respect to the direction of the illuminating light beams and a corresponding change in the lamp field diaphragm an optimal association of the two object images can readily be adjusted for particular task purposes. In this connection, it is particularly advantageous to so select the association such that the object images each cover a separate half of the field of view. The images appear with full contrast, as well as with exactly equal brightness and spectral composition, so that an unobjectionable and fully compatible comparison is rendered possible.

Another solution of the task to provide a simple microscope for the simultaneous observation and unobjectionable comparison of two objects resides in accordance with the present invention in that the partially transmitting mirror which is arranged in the observation light path to deflect the illuminating light path onto one of the objects also serves to deflect the light passing through an image of the second object into the observation light path.

The image of the second object may be available from a slide through which the light passes from a separate light source and which is imaged by means of a projection lens in the image plane of the microscope eyepiece.

In both solutions, i.e., with or without an additional light source, it is of advantage to arrange all construction elements of the comparison light path in a housing equipped with means for attachment to the beam splitter of a reflected light microscope. In one form, it is merely required that the microscope housing shall include an opening on the back side of the deflecting mirror, for the illuminating light path to which the aforementioned housing for the construction elements is attached. In another form, it is possible to design the construction elements of the illuminating light path, the beam splitter and the elements of the comparison light path as an attachment to a transmitted light microscope and so arrange them as to effect a vertical illumination of the object arranged on the stage.

The novel comparison microscope can be applied with particular advantage to metallurgical investigations, affording structure-image comparisons of notable reliability. Also, rock grindings can be evaluated readily and safely, and fibre comparisons can be performed with assurance.

If the novel comparison microscope is applied to scanning photometry or to television-image analysis, the judgments obtained can be objectified by reference to the comparison image.

The embodiment of the novel comparison microscope in which the comparison arrangement comprises a microscope objective can also be applied with great advantage in criminology. Since the two light paths are absolutely symmetrical optically, the novel microscope is neutral as to color. This is of great importance since deviations in color can positively only be due to the object being analyzed. This also applies to photographic documentation of two comparison images in a common photographic slide, as described in German Pat. No. P 24 34 246.9-51, filed Feb. 15, 1974, being also the subject of a U.S. application filed on even date herewith Ser. No. 548,670, now U.S. Pat. No. 3,977,791 issued Aug. 31, 1976 (Attorney docket 15246) and assigned to the same assignee as for the present application.

It is thus apparent that the comparison microscope according to the present invention is versatile in its application, since it permits judgment of different samples by direct image comparison.

If standard objects are used and the comparison optical system includes a microscope objective, the observer is not only able to make a statement as to form and color of the image, but also to give information on brightness. Such a statement as to brightness is, for instance, of importance in fluorescence microscopy.

To enable a defined statement as to brightness, it is expedient to provide attenuator means in the comparison light path for changing image brightness. By such means, equal image brightness can be established between the object image and the comparison image, the position of the attenuator being representative of the image brightness.

In many cases, it may also be advantageous to use an artificial specimen with a fluorescent-screen background as a comparison object. Such a specimen also permits a definite statement as to brightness, since the comparison image will be known to have a previously defined exact brightness.

The invention will now be described more fully with reference to the accompanying drawings, in which:

FIG. 1 is a perspective view illustrating an embodiment of a comparison microscope designed in accordance with the present invention;

FIG. 2 is an optical diagram schematically illustrating a comparison microscope with symmetrically designed light paths and a physical comparison object;

FIG. 3a illustrates a lamp field diaphragm used in the microscope of FIG. 2;

FIG. 3b illustrates the field of view of the microscope of FIGS. 1 and 2, as seen through its single eyepiece;

FIG. 4 is an optical diagram, schematically illustrating another comparison microscope, in which the image of a comparison object is imaged in the observation light path; and FIG. 5 illustrates the field of view of the microscope of FIG. 4.

In FIG. 1, reference numeral 1 designates a commercially available reflected-light microscope which comprises an objective 2 and an eyepiece 3, and it will be understood that instead of the monocular tube illustrated here, a binocular tube can also readily be used. Reference numeral 4 designates a microscope illuminator which may be secured by screw-thread engagement to a beam-splitter housing 5. This beam splitter includes a partially transmitting mirror 14 (FIG. 2) which directs the illuminating light through an objective 2 onto an object 6.

Reference numeral 7 designates a cylindrical component part which includes the comparison arrangement and which may also be threadedly secured to the beam-splitter housing 5, at another opening, facing the opening for entry of the illuminating light path. The component part 7 is provided with a screw 8 by means of which the comparison light path can be adjustably inclined, the adjusted inclination being indicated at $\alpha$ in FIG. 2. Reference numeral 9 designates a slot into which a physical comparison object can be inserted. The comparison objective arranged in the component part 7 is focused onto the comparison object by means of a knurled ring 10.

As further shown in FIG. 2, the microscope illuminator 4 comprises a light source 11, a condenser 12 as well as a lamp field diaphragm 13. The splitting mirror 14 in the beam-splitter 5 directs a portion of the light originating from the light source 11 and passing through the objective 2 onto the object 6 to be analyzed. The light reflected by this object, or in the case of fluorescence microscopy emitted by the object, passes through the splitting mirror 14 into the eyepiece 3 as light path 15.

The comparison arrangement 7 comprises a microscope objective 16 which exactly corresponds to the objective 2. Also, the comparison object 17 is included. This object is illuminated through the splitting mirror 14, and the light reflected or emitted by the object 17 is deflected into the light path 15 by the mirror 14.

As can be seen from FIG. 2, the light paths in the observation path and in the comparison path are fully symmetrical. In the illustrated embodiment, an attenuator in the form of a movable neutral wedge 18 is arranged in the pupil of the comparison light path. By selectively adjusted movement of this wedge in the direction suggested by double arrow 18', the brightness in the comparison light path can exactly be adapted to that in the observation light path.

The means whereby adjustment at 8 is operative to selectively tilt or incline the comparison light path is in FIG. 2 suggested by the rotary two-way arrow 8', which will be understood to apply to tilted adjustment of the microscope objective 16 and its axis, to the extent $\alpha$.

As illustrated in FIG. 3a, the lamp-field diaphragm 13 of FIG. 2 includes an opening 19 in the form of half a square which is arranged asymmetrically with respect to the optical axis. Thereby, the observation objective 2 only supplies an image portion in the eyepiece 3 which covers half of the field of view. The comparison objective 16 together with the comparison object 17 is, as is illustrated, inclined relatively to the optical axis such that the comparison image 17' assumes the position of the field of view not used for the observation path of rays. It thus results that two adjacent images 17' and 6' appear in the eyepiece 3, as is shown by FIG. 3b. These images are associated with the object 6 to be analyzed and the comparison object 17. By movement of the lamp field diaphragm 13 transverse to the optical axis (by adjustment suggested at 13') and by correspondingly changing the inclination $\alpha$ of the comparison objective 16, the boundary line between the partial images 17' and 6' can be selectively positioned, to accomplish field division other than the half-and-half division shown.

In the embodiment illustrated in FIG. 4, an image of the comparison object is deflected into the observation light path 15. The comparison light path herein comprises an additional light source 21 illuminating a slide 23 via a condenser 22. The light passing through this slide is imaged in the image plane of the microscope eyepiece 3 by means of a projection objective 24. Expediently, the slide 23 does not only comprise one, but several comparison images enabling an observer to compare the object image with two or more different comparison images.

Also in the embodiment of FIG. 4, a lamp-field diaphragm 20 having a small circular opening is arranged in the illumination light path. A portion of the object 6 is illuminated through this opening so that finally the circular image 6' illustrated in FIG. 5 is viewed in the eyepiece 3. At the same time, a circular diaphragm 25 is arranged in the comparison light path to mask the central portion of the image. The image 23' of the slide 23 is then observed as a circular ring around the image 6', as is shown in FIG. 5.

In the association of the two images illustrated in FIG. 5, only the center of the image supplying a particularly good image is used by the microscope objective 2. Of course, it is possible to use the lamp field diaphragm 13 illustrated in FIG. 2 instead of the lamp field diaphragm 20, and to so incline the comparison light path that the image of the slide is projected into the position not used for the image of object 6 so that finally, there can be observed in the field of view of the eyepiece 3, an image which corresponds to FIG. 3b.

It will be understood that, instead of the reflected light microscope 1 illustrated in FIG. 1, a transmitted light microscope can be used to carry out the invention. To this end, it is necessary to design the construction elements 4 of the illuminating light path, the beam splitter 5 and the component parts 7 of the comparison light path as the attachment, and to so arrange the same that the object 6 is illuminated by vertical light.

What is claimed is:

1. In a comparison microscope for the simultaneous observation of two objects, optical-element means including a first microscope objective on an observation-light path to a first object, a partially transmitting mirror arranged in and inclined with respect to the observation-light path, illuminating means offset to one side of said mirror, including a light source and a diaphragm having a straight edge defining the border between a light-transmitting area and a light-blocking area, said diaphragm being positioned with its light-transmitting area asymmetrical to the axis of light from said light source to said mirror, said mirror being positioned to reflect light from said source on the observation-light path through said microscope objective, whereby an image of the first object is viewable on the observation-light path as light transmitted via said first objective and through said mirror, part of the light from said source passing through said mirror and generally transverse to said observation-light path, a second microscope objective having its axis so positioned in the path of light-source light transmitted through said mirror as to illuminate a second object and to cause light reflected by the second object to place an image of the second object as a reflection from said mirror on the observation-light path, the axis of said second microscope objective being so tilted with respect to the axis of light from said source to said mirror that the image of the second object is viewable directly adjacent the image of the first object within that part of the field of view which is not illuminated by the light coming through said diaphragm.

2. The comparison microscope of claim 1, in which selectively variable attenuating means is provided on the axis of said second microscope objective.

3. The comparison microscope of claim 1, in which the second object is an artificial specimen with a fluroescent-screen background.

4. The comparison microscope of claim 1, in which said reflected-light microscope including a housing for said mirror, said housing having an opening to the side of said mirror away from said source, all structural elements of the comparison light path between said second microscope objective and said mirror being contained in a unitary housing having means for selective attachment to said mirror housing at the opening thereof.

5. The microscope of claim 1, in which said diaphragm is selectively positionable transverse to the axis of light from said light source to said mirror, and in the direction perpendicular to said straight edge.

6. The microscope of claim 5, in which said second microscope objective is mounted for selective tilt of its axis about a tilt axis that is parallel to said straight edge.

7. The microscope of claim 1, in which said diaphragm is a rectangular stop, said straight edge being one of the two elongate opposed side margins of the stop opening.

* * * * *